United States Patent [19]
Menet

[11] 3,835,195
[45] Sept. 10, 1974

[54] ETHER SULPHONES
[75] Inventor: Albert Menet, La Mulatiere, France
[73] Assignee: Rhone-Poulenc S.A., Paris, France
[22] Filed: Feb. 1, 1973
[21] Appl. No.: 328,611

[30] Foreign Application Priority Data
Feb. 2, 1972  France .................... 72.3484

[52] U.S. Cl. .................... 260/607 A, 260/680 R
[51] Int. Cl. .................... C07c 147/04, C07c 147/06
[58] Field of Search .................... 260/607 A

[56] References Cited
FOREIGN PATENTS OR APPLICATIONS
1,543,577  9/1969  Germany .................... 260/607 A
1,483,715  5/1964  France .................... 260/607 A OTHER PUBLICATIONS
Rec. Trav. Chim. p. 1047–1062 Van Zuydewijn vol. 56.
Wagner & Zook p. 226-7.

Primary Examiner—Lewis Gotts
Assistant Examiner—D. R. Phillips
Attorney, Agent, or Firm—Stevens, Davis, Miller & Mosher

[57] ABSTRACT

Sulphones of formula $RSO_2 \; CH_2-C(CH_3) = CH-CH_2OR_1$ I and $RSO_2CH_2-CH = C(CH_3)-CH_2OR_1$ II wherein R and $R_1$ are optionally substituted alkyl or aryl, are intermediates in the preparation of compounds with a saturated or unsaturated isoprene chain.

4 Claims, No Drawings

ETHER SULPHONES

This invention relates to ether sulphones and processes for making them.

The present invention provides a sulphone of the general formula:

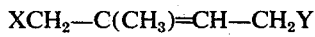

wherein one of X and Y represents a sulphone group of formula $SO_2R$ and the other represents an ether group of formula $OR_1$, and each of R and $R_1$, which may be the same or different, represents an alkyl or aryl radical which is substituted or unsubstituted.

These sulphones are thus of the general formulae:

I or 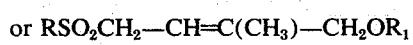

II $R_1$ preferably represents an alkyl radical, preferably of one to four carbon atoms, especially a methyl radical. R preferably represents an aryl radical (e.g. an aromatic hydrocarbon radical such as phenyl) which may be substituted e.g. by a chlorine or alkyl with for example one to four carbon atoms.

These sulphones can be used as intermediates in organic synthesis. By virtue of the reactivity due to their sulphonyl group with respect to certain functional compounds, such as halides, they are used, for example, to prepare compounds the structure of which possesses a saturated or unsaturated isoprene chain which carries an ether group of a phenol or an alcohol.

For example, compounds of formula I may be reacted with alkyl halides e.g. geranyl bromide or 5-(2,6,6-trimethylcyclohex-1-enyl)-1-chloro-3-methyl-penta-2,4-diene in the presence of base to form sulphonated coupled products, which on desulphonation with base are converted to conjugated or unconjugated polyenes, e.g. the methyl ether of farnesol (used in perfumery) or Vitamin A. Reactions of compounds of formula I and alkyl halides, with desulphonation of the product are described in Ser. No. 328,537 filed 1st Feb., 1973 in the names of Pierre Chabardes, Marc Julia and the present Applicant.

Compounds of formula II may be reacted with retinyl halides, e.g. retinyl chloride in the presence of a base to form sulphonated coupled products, which on desulphonation with base are converted to ethers of β-apo-12′ carotenol used in alimentary industry as a colourant.

These sulphones can be prepared by various methods. Preferably the method comprises reacting a compound of formula:

III wherein Hal represents a halogen atom, with a compound of formula MX in which M represents an alkali metal and X and Y are as defined above. They are obtained, for example, by reacting an alkali metal compound of formula $R_1OM$ with a 4-alkyl- (or aryl)-sulphonyl-2-or-3-methyl-but-2-enyl halide, the latter compounds being obtained, for example, by addition of an alkyl or aryl sulphonyl halide to isoprene or by reacting 1,4-dichloro-methyl-but-2-ene with a alkali metal alkyl-or aryl-sulphinate. 4-Alkyl-(and aryl)-sulphonyl-2—methyl-but-2-enyl halides and the latter method of making them are described and claimed in Serial No. 328,600 filed 1st Feb., 1973 in the name of the applicant.

A preferred process for the selective preparation of the sulphones of formula I comprises reacting an alkali metal sulphinate of formula $RSO_2M$ (where M represents an alkali metal atom) with a 4-alkoxy- (or 4-aryloxy)-2-methyl-but-2-enyl halide, which may itself be obtained from reaction of an alkali metal alcoholate or phenolate with a 1,4—dihalogeno-2-methyl-2-butene.

The following examples illustrate the preparation of these sulphones.

EXAMPLE 1

A mixture of 14.5 g of 4-methoxy-2-methyl-but-2—enyl bromide, 21.34 g of sodium phenylsulphinate and 99 cm³ of ethylene glycol is heated at 110°C for 2 hours, with stirring. The reaction mixture is then poured into 500 cm³ of salt water and 200 cm³ of diethyl ether. The aqueous layer is decanted and extracted with 3 times 50 cm³ of diethyl ether. The combined ether layers are washed with 4 times 100 cm³ of water, dried over magnesium sulphate, filtered and concentrated; a pale yellow oily liquid is thus obtained which, when heated for 2 hours at 100°C and under a vacuum of 0.1 mm Hg, gives 15.4 g of a brown liquid in which 90 percent of a compound corresponding to the formula:

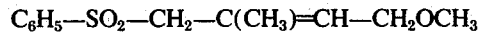

IV is identified and measured by nuclear magnetic resonance.

4-Methoxy-2-methyl-but-2-enyl bromide was prepared by reacting practically equimolecular amounts of 1,4-dibromo-2—methyl-2-butene and sodium methylate in methanol.

The yield of the compound of the formula IV relative to the dibromo-methyl-butene employed is 54 percent.

EXAMPLE 2

2.55g of 4-phenylsulphonyl-2-methyl-1-chloro-2—butene are added to a flask which contains 0.85 g of sodium methylate and 25 cm³ of methanol and the mixture is heated under reflux for 17 hours. The flask is then cooled under running water, the reaction mixture is filtered and the residue is rinsed on the filter with 5 cm³ of methanol. The filtrate is concentrated under the vacuum provided by a water pump and the residue is taken up in a mixture of 50 cm³ of water and 50 cm³ of diethyl ether. The aqueous layer is decanted and extracted with twice 25 cm³ of diethyl ether. The combined ether layers are washed with water until the pH is 7, dried over sodium sulphate, filtered and then concentrated by evaporation. 2g of an orange-red liquid product are obtained, in which 60 percent of a compound corresponding to the formula:

$C_6H_5SO_2-CH_2-CH=C(CH_3)-CH_2OCH_3$ is identified and measured by nuclear magnetic resonance.

The yield relative to the sulphone employed is 47 percent.

4-Phenylsulphonyl-2-methyl-1-chloro-2-butene was prepared by reacting sodium phenylsulphinate with 1,4—dichloro-2-methyl-2-butene in anhydrous ethanol and heating at about 40°C.

I claim:

1. A sulphone of the general formula:

$$XCH_2-C(CH_3)=CH-CH_2Y$$

wherein one of X and Y represents a sulphone group of formula $SO_2R$ and the other represents an ether group of formula $OR_1$, R is phenyl or phenyl substituted by chlorine or alkyl of one to four carbon atoms, and $R_1$ is alkyl of one to four carbon atoms.

2. A sulphone according to claim 1 wherein R represents a phenyl radical and $R_1$ represents an alkyl radical of one to four carbon atoms.

3. A sulphone according to claim 1 which is 4-methoxy—2-methyl-but-2-ene-1-phenylsulphone.

4. A sulphone according to claim 1 which is 4-methoxy—3-methyl-but-2-ene-1-phenylsulphone.

* * * * *